United States Patent
Lawniczak et al.

(10) Patent No.: US 12,459,636 B2
(45) Date of Patent: Nov. 4, 2025

(54) FLIGHT COMPENSATOR CONTROL SYSTEM FOR AIRCRAFT WITH HAPTIC FEEDBACK

(71) Applicant: Safran Electronics & Defense, Paris (FR)

(72) Inventors: Remi-Louis Lawniczak, Moissy-Cramayel (FR); Christophe Bastide, Moissy-Cramayel (FR)

(73) Assignee: Safran Electronics & Defense, Paris (FR)

( * ) Notice: Subject to any disclaimer, the term of this patent is extended or adjusted under 35 U.S.C. 154(b) by 0 days.

(21) Appl. No.: 18/566,023

(22) PCT Filed: Jun. 3, 2022

(86) PCT No.: PCT/FR2022/051063
§ 371 (c)(1),
(2) Date: Nov. 30, 2023

(87) PCT Pub. No.: WO2022/254162
PCT Pub. Date: Dec. 8, 2022

(65) Prior Publication Data
US 2024/0246660 A1    Jul. 25, 2024

(30) Foreign Application Priority Data
Jun. 4, 2021   (FR) ..................... 2105919

(51) Int. Cl.
*B64C 13/50*     (2006.01)
*B64C 27/04*     (2006.01)

(52) U.S. Cl.
CPC ............ *B64C 13/507* (2018.01); *B64C 27/04* (2013.01)

(58) Field of Classification Search
CPC ....... B64C 13/02; B64C 13/04; B64C 13/042; B64C 13/044; B64C 13/08; B64C 13/46
See application file for complete search history.

(56) References Cited

U.S. PATENT DOCUMENTS

| | | | |
|---|---|---|---|
| 2,736,518 A | 2/1956 | Degenfelder | |
| 4,228,386 A * | 10/1980 | Griffith | B64C 13/38 244/223 |
| 4,345,195 A * | 8/1982 | Griffith | G05D 1/0061 318/580 |
| 4,426,607 A * | 1/1984 | Black | B64C 13/38 318/580 |

(Continued)

FOREIGN PATENT DOCUMENTS

GB           763506 A        12/1956

OTHER PUBLICATIONS

Wang et al. "Commercial Aircraft Hydraulic Systems." 2016. pp. 1-4. (Year: 2016).*

(Continued)

*Primary Examiner* — Joshua J Michener
*Assistant Examiner* — Michael B. Kreiner
(74) *Attorney, Agent, or Firm* — Kilpatrick Townsend & Stockton LLP

(57) ABSTRACT

This aircraft flight compensator control system includes a motor and a variable-friction actuator coupled with the motor and with an output shaft.
The variable-friction actuator includes a variable-friction-torque magnetic clutch connected to the output shaft.

8 Claims, 1 Drawing Sheet

(56) References Cited

U.S. PATENT DOCUMENTS

| | | | | |
|---|---|---|---|---|
| 4,717,098 | A * | 1/1988 | Walker | B64C 13/0421 |
| | | | | 244/234 |
| 7,044,024 | B1 | 5/2006 | Younkin | |
| 8,907,536 | B2 * | 12/2014 | Cremiere | H02K 11/28 |
| | | | | 310/68 B |
| 10,030,756 | B2 * | 7/2018 | Wilkens | B64C 13/34 |
| 10,106,245 | B2 * | 10/2018 | Wilkens | B64C 27/605 |
| 10,279,897 | B2 * | 5/2019 | Cremiere | B64C 13/0421 |
| 11,117,650 | B2 * | 9/2021 | Dee | G05B 11/42 |
| 11,414,176 | B2 * | 8/2022 | Dee | B64C 13/0421 |
| 11,433,989 | B2 * | 9/2022 | Lawniczak | B64C 13/0421 |
| 11,518,497 | B2 * | 12/2022 | Spiegel | B64C 13/505 |
| 11,560,225 | B2 * | 1/2023 | Spiegel | B64C 27/56 |
| 11,628,925 | B2 * | 4/2023 | Lawniczak | B64C 13/507 |
| | | | | 244/234 |
| 11,738,856 | B2 * | 8/2023 | Dee | B64C 13/12 |
| | | | | 700/1 |
| 2003/0183728 | A1 * | 10/2003 | Huynh | B64C 13/345 |
| | | | | 244/224 |
| 2016/0221674 | A1 | 8/2016 | Latham et al. | |
| 2022/0057826 | A1 * | 2/2022 | Lawniczak | G05G 5/03 |

OTHER PUBLICATIONS

International Patent Application No. PCT/FR2022/051063, International Search Report, Translation of International Search Report, and Written Opinion, dated Sep. 15, 2022.

* cited by examiner

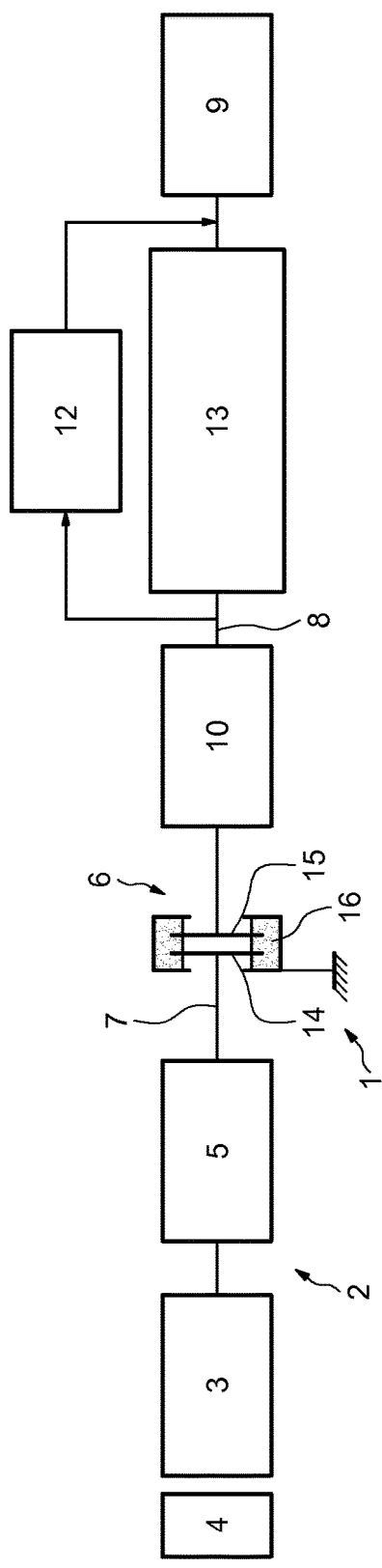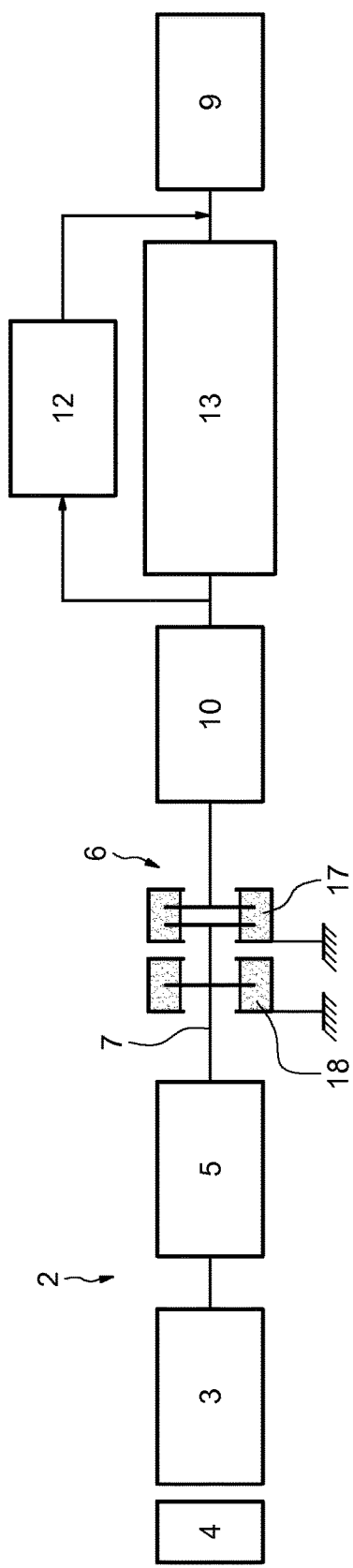

FLIGHT COMPENSATOR CONTROL SYSTEM FOR AIRCRAFT WITH HAPTIC FEEDBACK

The present invention relates to flight control systems for aircraft and relates more particularly to the control of a flight compensator for aircraft, in particular for a helicopter.

Compensators or TRIM systems in particular have the function of compensating various disturbances capable of having an influence on the flight parameters of the aircraft, without the pilot having to act upon the flight controls.

TRIM actuators conventionally return to the pilot a resistant force on the flight controls in the form of a haptic feedback. This force is generally generated by a spring, a short-circuited electric motor, a mechanical friction and is as such essentially passive.

The haptic feedback applied to the flight controls by the TRIM actuators is as such constant and corresponds to a torque level fixed at design.

It is particularly constant, regardless of the position of the flight control.

In particular, spring TRIM actuators require a specific architecture for each flight control, particularly specific to rolling, yaw, pitch, etc.

When it is sought to modify the haptic feedback, for example to provide a resistive force or a damping, for example after testing a first prototype on an aircraft, it is required to reconfigure the entire force feedback chain.

It has been proposed to replace conventional TRIM actuators by active actuators comprising a powered and controlled electric motor directly connected to the output shaft of the actuator and actuating upon the flight controls.

TRIM actuators of this type firstly require high-capacity electric motors, which generate a high electrical consumption and have a very substantial mass.

The control electronics must also be high-performance.

It has also been proposed to use an electric motor directly connected to the flight control and having a high and continuous rotation speed, and to use an actuator comprising a magnetorheological brake which supplies a controlled haptic feedback.

This type of actuator also has a certain number of major drawbacks relative to the high electrical consumption of the motor, the operating noise, the substantial wear of the actuator and the use of complex, and as such costly, control electronics.

The aim of the invention is therefore that of remedying these various drawbacks and providing a flight compensator control system which is capable of supplying a haptic feedback which is variable.

The invention therefore relates to an aircraft flight compensator control system comprising a motor and a variable-friction actuator coupled with the motor and with an output shaft.

The actuator comprises a variable-friction-torque magnetic clutch connected to the output shaft.

The control system further includes a reduction gear placed between the motor and the actuator. Thanks to the reduction gear, it is possible to use a motor having a lower power, in particular a relatively low torque, and requiring less complex control electronics.

Furthermore, the variable-friction-torque clutch makes it possible to modify the haptic feedback supplied to the pilot, for example by modifying the stiffness of the control or by creating virtual stops.

For example, the variable-friction-torque clutch includes two disks, one connected to the motor and the other to the output shaft, a magnetorheological fluid in contact with the disks and magnetic field source acting upon the magnetorheological fluid to vary the friction torque between the disks.

According to another feature, the control system includes an angular position sensor of the output shaft.

It can further comprise means for detecting a direction of the force applied to the output shaft.

For example, the detection means comprise a relative position sensor between two shaft portions connected with clearance.

In an embodiment, the reduction gear is an irreversible reduction gear.

In another embodiment, the control system further comprises a magnetorheological brake inserted between the magnetic clutch and the motor, the reduction gear being a reversible reduction gear.

The invention also relates to a helicopter comprising a compensator control system as defined above.

Other aims, features and advantages of the invention will appear upon reading the following description, given solely as a non-limiting example, and made with reference to the appended drawings wherein:

FIG. 1 schematically illustrates the general structure of a flight control compensator control system according to the invention; and FIG. 2 schematically illustrates the structure of a flight control compensator control system according to another embodiment.

In FIG. 1, the general architecture of a TRIM helicopter control system according to the invention, designated by the general reference number 1, has been shown.

This control system is intended to supply a haptic feedback to the pilot which is modifiable under the effect of a control applied thereto, in particular during the flight of the aircraft, and which has a relatively low consumption and mass.

This control system includes a geared motor 2 comprising a motor 3 associated with a position sensor 4 of the motor to enable the control of the motor and a reduction gear 5.

The motor 3 is a low-torque and high-rotation speed motor, for example of the order of 5 degrees per second, the reduction gear being a high gear reduction ratio, for example of the order of 50.

The control system 1 further includes a variable-friction actuator 6 coupled with a motor shaft 7, at the output of the reduction gear, and connected to the output shaft 8 of the control system which acts upon a flight control instrument, such as a control stick or a rudder bar, via a control wheel 9.

Moreover, the control system includes a first angular position sensor 10 measuring the angular position of the output shaft 8 relative to a fixed point, consisting for example of the frame of the control system.

Furthermore, in an embodiment, the line shafting of the output shaft includes two shaft portions interconnected with clearance allowing an angular displacement for example of the order of 0.1° and with a low actuation stiffness. As illustrated, the control system then comprises a second angular position sensor 12 measuring the relative angular position between the two shaft portions in the clearance zone 13 to detect the changes in direction of the force applied by the pilot on the flight control instrument.

The control system is supplemented by an electronic board (not shown), receiving the angular position measurements delivered by the first position sensor 10 and by the second position sensor 12 and receiving the position measurement of the position sensor 4 of the motor to control the motor as well as the variable-friction actuator 6.

The variable-friction actuator 6 consists, in the embodiment example illustrated in FIG. 1, of a variable-friction-torque magnetic clutch which is inserted between the output shaft of the reduction gear 5 and the output shaft of the control system connected to the control wheel 9. For example, this clutch comprises two disks 14 and 15, one connected to the motor shaft 7 and the other to the output shaft 8 and a magnetorheological fluid 16 locally filling the space between the two disks 14 and 15 so as to be in contact with these disks, a magnetic field source, for example a coil powered under the control of the electronic board, delivering a magnetic field acting upon the magnetorheological fluid in the zone located between the two disks so as to vary its viscosity and hence the friction torque between the two disks.

Thus, according to the command applied thereto, the control system described above can modify the force or the damping applied to the flight control instrument in particular by acting upon the rotation speed of the motor and upon the friction torque supplied by the clutch, in particular according to the flight phases of the helicopter.

It also makes it possible to supply virtual stops making it possible to virtually increase the force required to attain certain positions of the control instrument according to the flight phases, for example to prevent critical positions capable of generating dysfunctions.

This control system also makes it possible to provide control assistance by supplying an active force making it possible to reposition the control instrument to the initial position.

Furthermore, the magnetic clutch is placed as close as possible to the output and as such helps smooth and eliminate all effect of the drive. The control system benefits from a safety effect in the event of locking of the geared motor 2, on account of the possible slip of the clutch to return control to the pilot.

For example, the control system described above functions as follows.

Firstly, the control system can be used to deliver a variable force according to an increasing force law.

In this case, the electric rotates in an opposite direction to that of the output shaft 8 connected to the control instrument. It is driven at a low rotation speed and the clutch supplies a force feedback F according to a law F=f(position, speed) which increases according to the position and the speed of the output shaft 8.

This operating mode ensures reactivity and safeguards onboard equipment in the event of a failure.

When the pilot releases the control instrument, for example the control stick, the electric motor, which rotated in the direction opposite that of the output shaft 8 returns the control stick to the initial position.

If the pilot returns the control stick to zero at low speed, i.e. a speed less than the rotation speed of the motor during the first phase, the second position sensor 12 detects that no change in direction of the force supplied by the pilot has occurred. The clutch 6 supplies a force feedback F=f(position, speed) to return the control stick to low speed.

The electric motor then returns the control stick to zero.

On the other hand, if the pilot returns the control stick to zero at high speed, i.e. at a speed greater than the speed of the electric motor of the first phase, the second position sensor 12 detects the change of direction of the force supplied by the pilot and the electric motor is accelerated until the position sensor once again detects a change of direction of the force, the rotation speed of the motor, greater than the actuation speed of the control instrument makes it possible to make up for the clearance that existed initially. Then, the electric motor returns the control stick to zero.

It will be noted that between these various phases, the electric motor is stopped.

In the embodiment described with reference to FIG. 1, the reduction gear 5 is an irreversible reduction gear, such that the forces applied on the control instrument are not passed by the reduction gear onto the motor.

In another embodiment illustrated in FIG. 2, wherein the geared motor 2, the first and second position sensors 10 and 12 and the clearance zone 13 as well as the control wheel 9 can be seen, the friction actuator 6 comprises a magnetic clutch 17, similar to the magnetic clutch described above with reference to FIG. 1 and a magnetorheological brake 18 comprising for example a disk in contact with a rheological fluid of which the viscosity and therefore the friction force is modified under the effect of a magnetic field. In this case, the reduction gear is not necessarily irreversible, the friction torque applied to the control wheel 9 consisting of the sum of the effects of the friction provided by the clutch 17 and by the brake 18.

The invention claimed is:

1. An aircraft flight compensator control system comprising a motor, and a variable-friction actuator coupled with the motor and with an output shaft, wherein the variable-friction actuator comprises a variable-friction-torque magnetic clutch connected to the output shaft, the aircraft flight compensator control system comprising means for detecting a sense of force applied to the output shaft, wherein the aircraft flight compensator control system comprises a reduction gear placed between the motor and the actuator, wherein the aircraft flight compensator control system further comprises a magnetorheological brake inserted between the magnetic clutch and the motor.

2. The aircraft flight compensator control system according to claim 1, wherein the magnetic clutch includes two disks, one connected to the motor and the other to the output shaft, a magnetorheological fluid in contact with the disks and magnetic field source acting upon the magnetorheological fluid to vary the friction torque between the disks.

3. The aircraft flight compensator control system according to claim 1, further comprising an angular position sensor of the output shaft.

4. The aircraft flight compensator control system according to claim 1, wherein the means for detecting the sense of force comprises a relative position sensor between two portions of the output shaft connected with clearance.

5. The aircraft flight compensator control system according to claim 4, wherein the two portions of the output shaft are connected with a clearance which allows an angular displacement.

6. The aircraft flight compensator control system according to claim 1, wherein the reduction gear is an irreversible reduction gear.

7. The aircraft flight compensator control system according to claim 1, wherein the reduction gear is a reversible reduction gear.

8. A helicopter comprising the aircraft flight compensator control system according to claim 1.

* * * * *